United States Patent
Hayashi et al.

(10) Patent No.: US 7,086,524 B2
(45) Date of Patent: Aug. 8, 2006

(54) MOTORIZED ROLLER

(75) Inventors: Hidetoshi Hayashi, Ohbu (JP); Kazuyoshi Umeda, Ohbu (JP)

(73) Assignee: Sumitomo Heavy Industries, Ltd., Tokyo (JP)

( * ) Notice: Subject to any disclaimer, the term of this patent is extended or adjusted under 35 U.S.C. 154(b) by 0 days.

(21) Appl. No.: 10/988,580

(22) Filed: Nov. 16, 2004

(65) Prior Publication Data
US 2005/0109584 A1 May 26, 2005

(30) Foreign Application Priority Data
Nov. 20, 2003 (JP) ............................ 2003-390152

(51) Int. Cl.
*B65G 13/06* (2006.01)
(52) U.S. Cl. ...................... 198/788; 198/780
(58) Field of Classification Search ............ 198/780, 198/788
See application file for complete search history.

(56) References Cited

U.S. PATENT DOCUMENTS

| | | | | |
|---|---|---|---|---|
| 3,693,779 A | * | 9/1972 | Tavernier et al. | 198/780 |
| 6,035,999 A | * | 3/2000 | Hall | 198/788 |
| 6,206,181 B1 | * | 3/2001 | Syverson | 198/788 |
| 6,244,427 B1 | * | 6/2001 | Syverson | 198/788 |
| 6,710,505 B1 | * | 3/2004 | Barani et al. | 198/788 |
| 2005/0040016 A1 | * | 2/2005 | Tasma et al. | 198/788 |

FOREIGN PATENT DOCUMENTS

JP    6-227630    8/1994

* cited by examiner

*Primary Examiner*—James R. Bidwell
(74) *Attorney, Agent, or Firm*—Squire, Sanders & Dempsey L.L.P.

(57) ABSTRACT

A compact motorized roller, which is usable in a wide temperature range with high reliability and is manufactured at low cost. The motorized roller has a motor in a roller body. The motor can rotate the roller body. In such a motorized roller, the motor is a brushless DC motor, and a resolver is installed as a magnetic pole position detector of the brushless DC motor.

6 Claims, 5 Drawing Sheets

MOTORIZED ROLLER

BACKGROUND OF THE INVENTION

1. Field of the Invention

The present invention relates to a motorized roller such as a motor pulley and a motor roller used in a conveyor or the like.

2. Description of the Related Art

Various motorized rollers have been conventionally proposed. Such a roller has a roller body and a motor contained in the roller body, and the motor rotates the roller body. This type of motorized roller is, as shown in FIG. 5 for example, used as a motor roller MR, which is disposed on a conveyor 2 to directly convey a package 4. Otherwise, the motorized roller, as shown in FIG. 6, may be used as a motor pulley MP for conveying a package 4 with the use of a belt 6.

FIG. 7 schematically shows a side sectional view of a conventionally known motorized roller 10 (refer to, for example, Japanese Patent Laid-Open Publication No. 1994-227630).

This motorized roller 10 comprises a roller body 11 of a substantially cylindrical member, a motor 12, and a reducer 13. The motor 12 and the reducer 13 are contained in the internal space of the roller body 11. Both ends of the roller body 11 are rotatably supported by a pair of first and second attachment brackets 14 and 15. The roller body 11 is rotatable in its peripheral direction. The motor 12 being an induction motor comprises a stator 16 which is composed of a coil wound around an iron core, and a cage-shaped rotor 17 coaxially disposed in the internal space of the stator 16.

In the motorized roller 10, when the motor 12 is energized, a motor shaft 12A rotates, and the reducer 13 slows down the rotation of the motor shaft 12A. Slowed output is transmitted to the roller body 11, so that the roller body 11 rotates in its peripheral direction.

By the way, when such a motorized roller 10 conveys a large package, it is necessary to increase the driving force of the motorized roller 10. Thus, a high power type of induction motor is adopted as the motor 12.

In the conventionally known motorized roller 10, however, heat generated from the motor 12 and the reducer 13 tends to accumulate in the roller body 11 due to its structure, so that there is a limit to reduction of temperature rise. Accordingly, taking a case of boosting the motor 12 at, for example, 0.1 kw or more to increase the driving force of the motorized roller 10, continuous operation time is restrained, and hence it seriously obstructs an operation schedule. In some cases, it is necessary to install a protective device to prevent the motor 12 from being burnt.

Due to restraint in motor power and/or the continuous operation time, for example, when conveying a large package with the motor roller MR, a plurality of motor rollers MR with low capacity are necessary to increase the whole driving force. Thus, there is a problem of increase in cost. To convey a large package by a single motor roller MR, it is necessary to enlarge the diameter of the motor. Thus, the external diameter of the roller is also enlarged, so that there is a problem that conveyor equipment such as a conveyor becomes large.

SUMMARY OF THE INVENTION

In view of the foregoing problems, various exemplary embodiments of this invention provide a compact motorized roller at low cost. The motorized roller can be used in a wide temperature range with high reliability, and is continuously operated with high power.

To achieve the foregoing object, according to one of the various exemplary embodiments of the present invention, a motorized roller comprises a roller body, and a motor contained in the roller body, and the motor rotates the roller body, wherein the motor is a brushless DC motor, and a resolver is installed as magnetic pole position detector of the brushless DC motor.

To solve the conventional problems, the inventors considered adopting the brushless DC motor that had better motor efficiency and could obtain larger starting torque than an induction motor, as a motor for the motorized roller. Also the inventors considered adopting a Hall integrated circuit as the magnetic pole position detector of the brushless DC motor.

Adopting the brushless DC motor can provide high power. The Hall integrated circuit, however, is sensitive to heat, and hence an available temperature range is confined. Thus, it is difficult to solve the conventional problems that motor power and continuous operation time are restrained. Furthermore, there is a limit to precisely detecting a turning angle by the Hall integrated circuit, so that the Hall integrated circuit is not suited for feedback control with high precision.

It was also considered using an encoder as the magnetic pole position detector, but the encoder is more sensitive to heat and vibration than the Hall integrated circuit. Thus, an available temperature range and a use environment are further limited.

Therefore, the brushless DC motor is used as the motor in the exemplary embodiments of the present invention. Also, the resolver is installed as the magnetic pole position detector of the brushless DC motor.

Since the resolver has a simple coil structure, and does not have an electronic circuit, the resolver is compact in size, and is available in a wide temperature range with high reliability. Accordingly, the combination of the brushless DC motor and the resolver can maximize the advantages of the brushless DC motor. Namely, the brushless DC motor is available in the wide temperature range with high reliability, in addition to being compact in size and low cost. Also, it is possible to obtain the motorized roller which can continuously operate in a high power region, in which the diameter of the roller is 125 mm or less and the capacity of the motor is 0.1 kw or more, though the continuous operation in the high power region have been conventionally considered to be impossible.

Various exemplary embodiments of the present invention can provide compact motorized rollers at low cost. The motorized roller is usable in the wide temperature range with high reliability, and can continuously operate with high power.

BRIEF DESCRIPTION OF THE DRAWINGS

Various exemplary embodiments of the present invention will be described in detail with reference to the accompanying drawings, wherein.

DETAILED DESCRIPTION OF THE PREFERRED EMBODIMENT

Various exemplary embodiments of this invention will be hereinafter described in detail with reference to the drawings.

Figure 1:
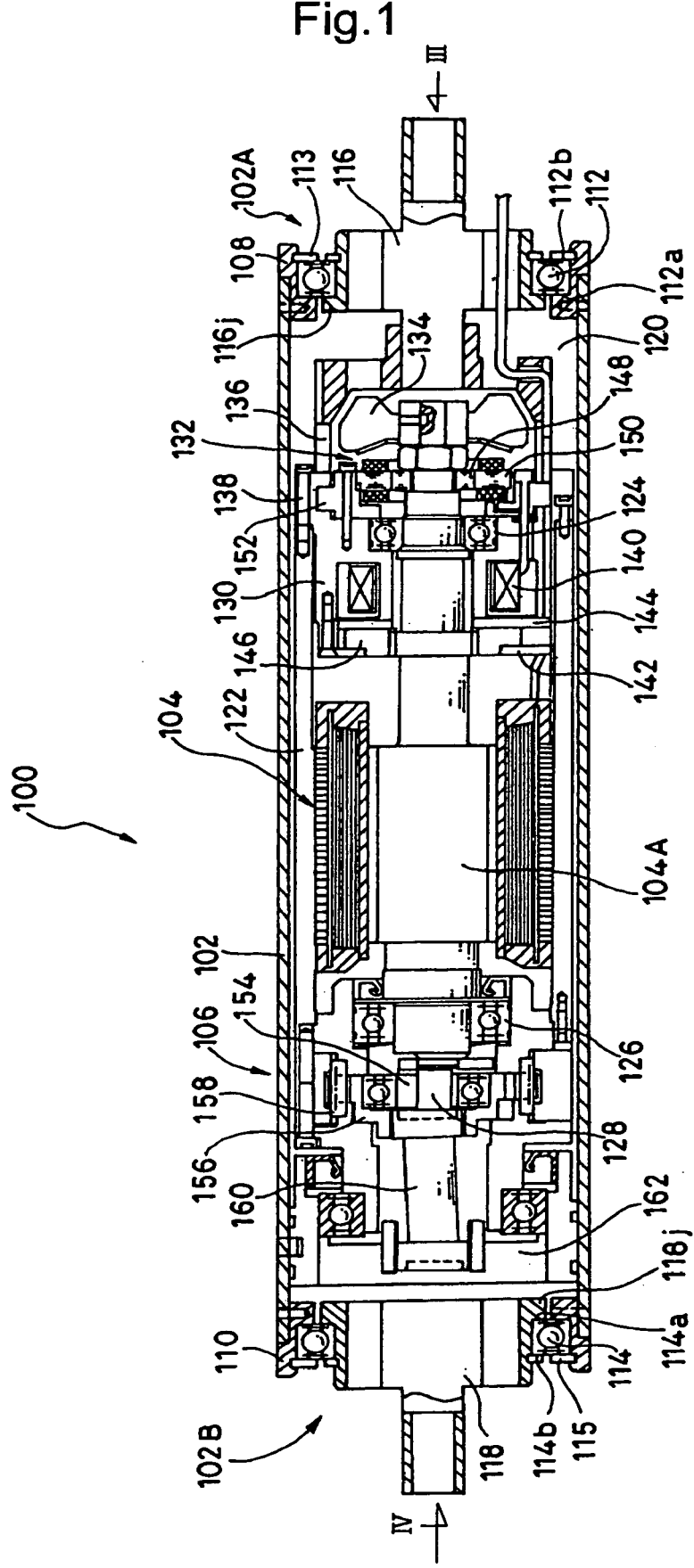
FIG. 1 is a side sectional view of a motorized roller according to an exemplary embodiment of the present invention.
Figure 2:
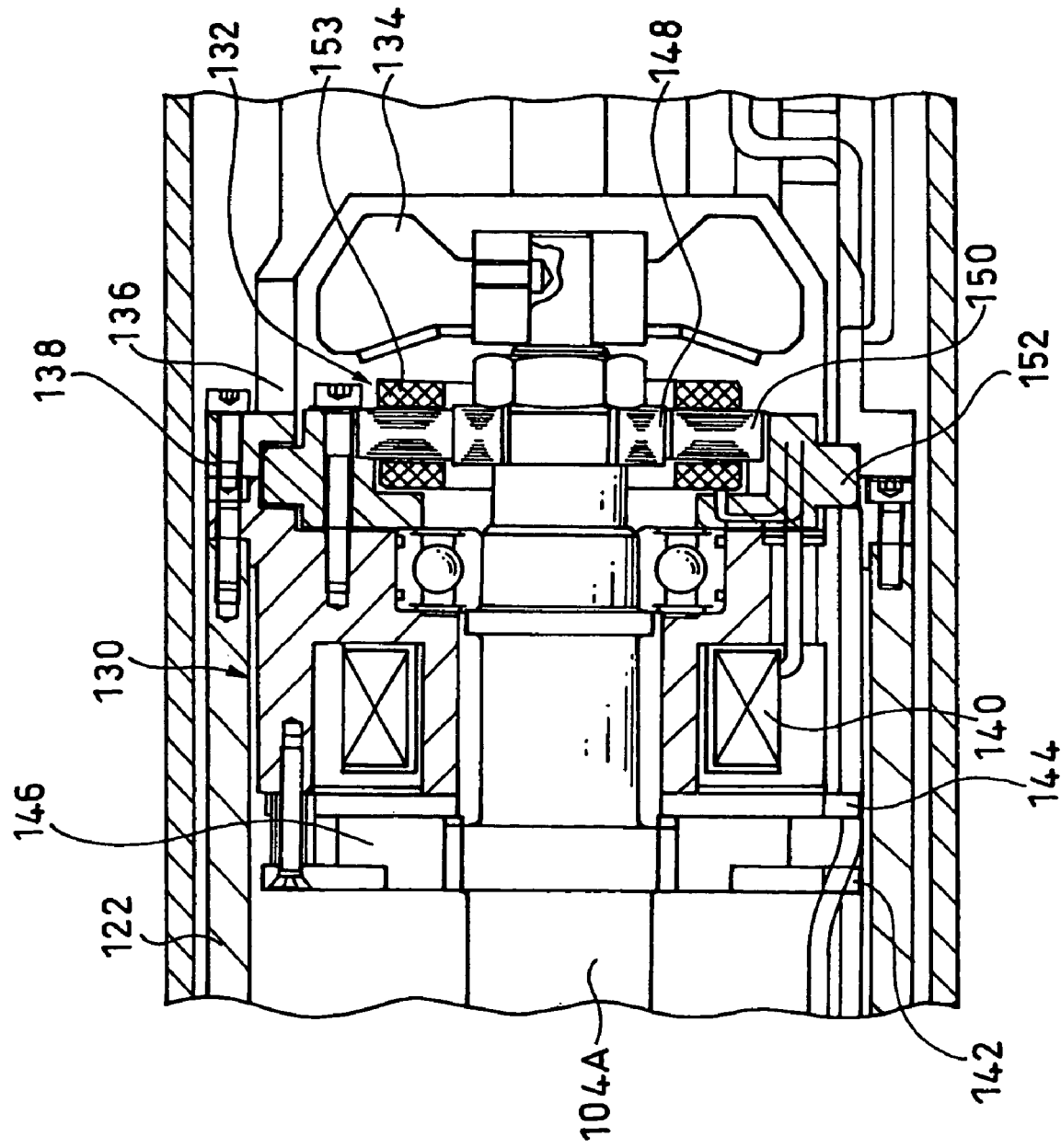
FIG. 2 is a partly enlarged sectional view which shows a vicinity of a resolver of the motorized roller of FIG. 1.
Figure 3:
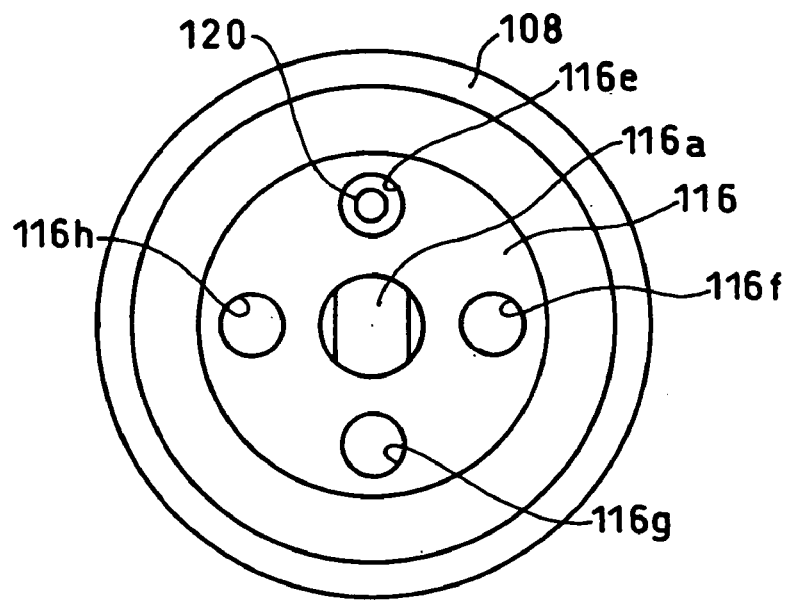
FIG. 3 is a sectional view viewed from a direction of the arrow III of FIG. 1.
Figure 4:
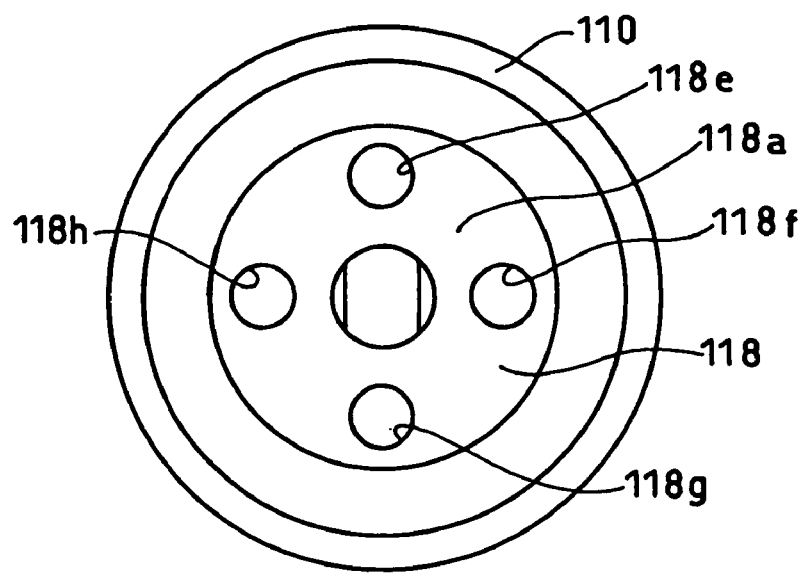
FIG. 4 is a sectional view viewed from a direction of the arrow IV of FIG. 1.
Figure 5:
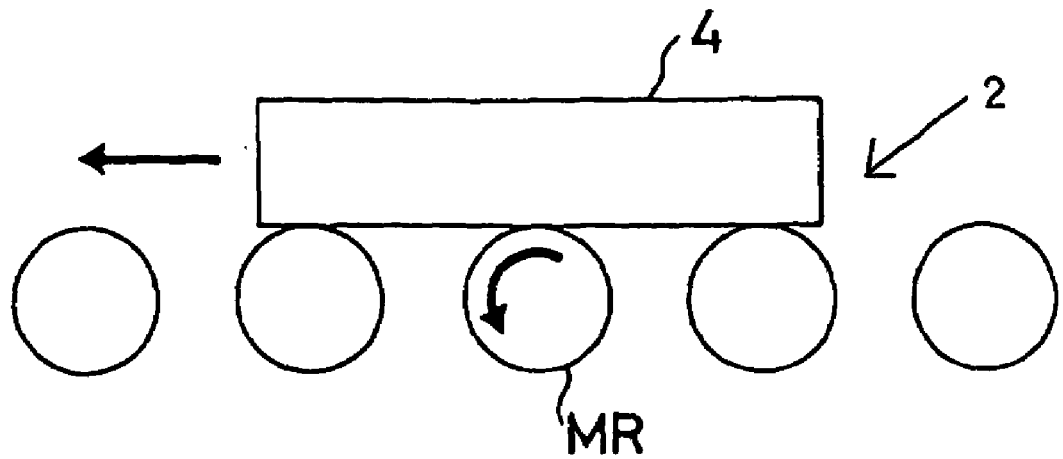
FIG. 5 is a schematic front view in which a motorized roller is applied to a motor roller.
Figure 6:
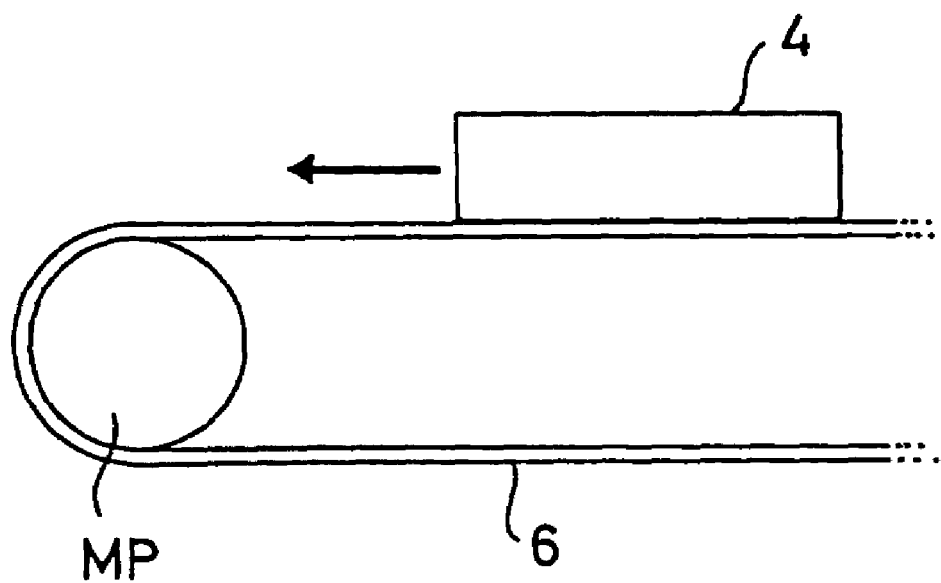
FIG. 6 is a schematic front view in which a motorized roller is applied to a motor pulley.
Figure 7:
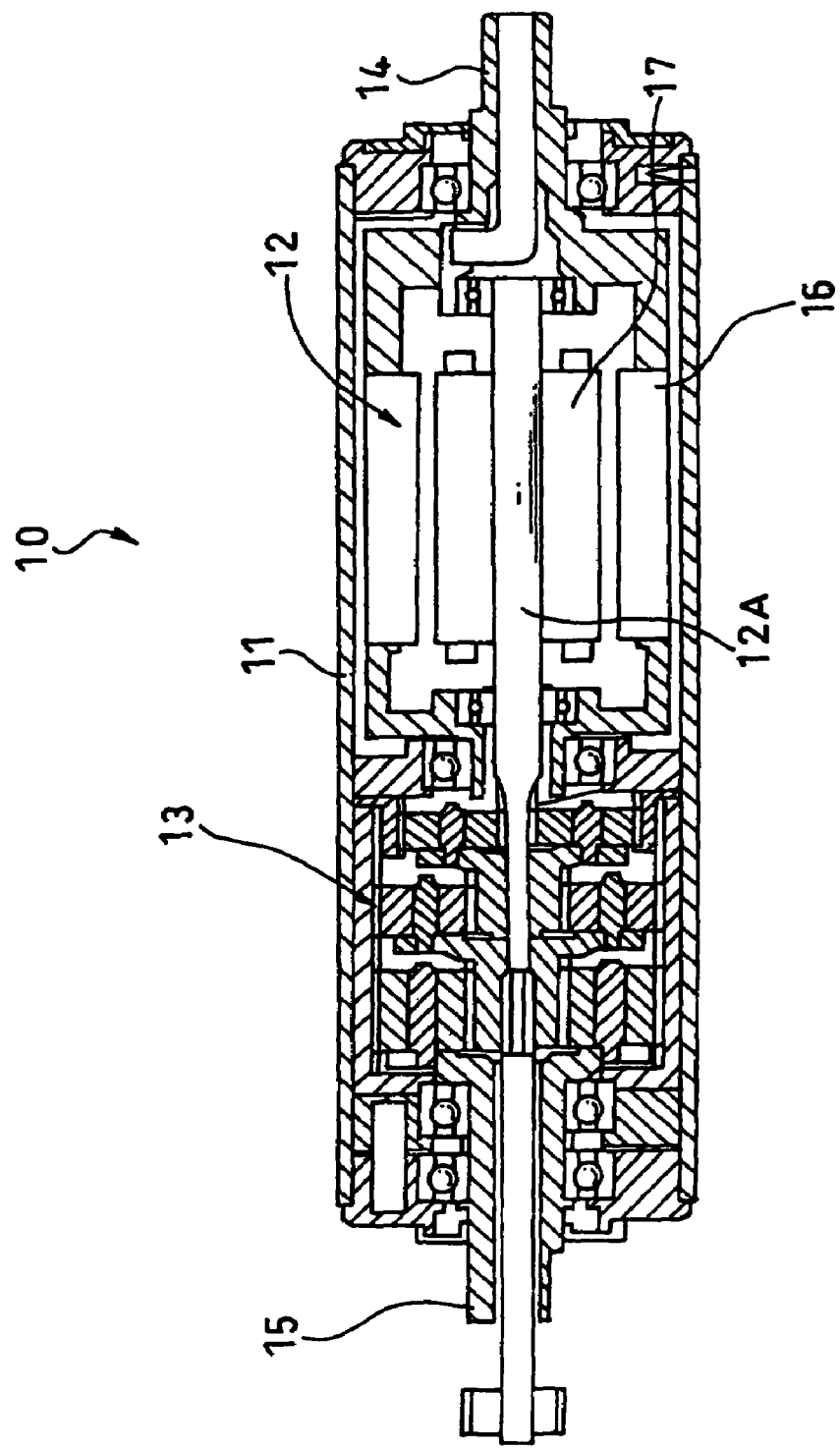
FIG. 7 is a side sectional view showing a conventional motorized roller.

FIGS. 1 and 2 show a motorized roller 100 according to an embodiment of the present invention. FIG. 1 is a side sectional view of the motorized roller 100 corresponding to the one shown in FIG. 6, and FIG. 2 is an essential enlarged sectional view of FIG. 1. FIGS. 3 and 4 are sectional views viewed from directions of the arrows III and IV in FIG. 1, respectively.

A roller body 102 of the motorized roller 100 is composed of a substantially cylindrical member. A motor 104 and a reducer 106 are contained in the internal space of the roller body 102. Bearings 112 and 114 are disposed at both ends 102A and 102B of the roller body 102 with ring-shaped members 108 and 110 interposed therebetween, respectively. A pair of first and second attachment brackets 116 and 118 are rotatably supported with respect to the roller body 102 with the bearings 112 and 114 interposed therebetween, respectively. In other words, the roller body 102 is rotatable in its peripheral direction about the pair of first and second attachment blackest 116 and 118.

Each of the first and second attachment brackets 116 and 118 is an approximately disk-shaped member. The first and second attachment brackets 116 and 118 function as conventional roller covers for closing both ends 102A and 102B of the roller body 102. The first and second attachment brackets 116 and 118 are, as shown in FIGS. 3 and 4, provided with attachment shafts 116a and 118a, respectively. Each of the attachment shafts 116a and 118a protrudes in an axial direction. The first and second attachment brackets 116 and 118 are fixed on an external member such as a conveyor frame via the attachment shafts 116a and 118a. Through holes 116e to 116h and 118e to 118h are formed in the first and second attachment brackets 116 and 118, respectively, to ventilate the inside of the roller body 102 from the outside. Of the four through holes 116e to 116h formed in the first attachment bracket 116, motor wiring 120 connected to the motor 104 is inserted into the through hole 116e.

Getting back to FIG. 1, a frame section 116j is provided on one end of the first attachment bracket 116 (on the side of the center of the roller body 102). The frame section 116j makes contact with an end face 112a of the bearing 112. A snap ring 113 is fitted into the other end of the first attachment bracket 116, and the snap ring 113 makes contact with an end face 112b of the bearing 112. In other words, the bearing 112 regulates the movement of the first attachment bracket 116 in its axial direction.

On the other hand, an end of the second attachment bracket 118 (on the side of the center of the roller body 102) is provided with a frame section 118j. The frame section 118j makes contact with an end face 114a of the bearing 114. A snap ring 115 is fitted into the other end of the second attachment bracket 118, and the snap ring 115 makes contact with an end face 114b of the bearing 114. In other words, the bearing 114 regulates the movement of the second attachment bracket 118 in its axial direction.

The motor 104 is a brushless DC motor. The "brushless DC motor" designates a permanent-magnet synchronous motor which needs a magnetic pole position detector. Both ends of a motor shaft 104A of the motor 104 are rotatably supported by a pair of bearings 124 and 126, which are installed in the motor case 122. One end (a left side in the drawing) of the motor shaft 104A, which further extends and protrudes from the bearing 126 with one side thereof being supported, is used as an input shaft 128 of the reducer 106 as is.

As shown in the enlarged view of FIG. 2, on the other hand, a brake 130 for braking the motor shaft 104A, a resolver (magnetic pole position detector) 132 for detecting a magnetic pole position of the motor shaft 104A, and an air cooling fan 134 rotatable together with the motor shaft 104A are disposed in the other end of the motor shaft 104A (on a right side in the drawing). A motor case 122 of the motor 104, the brake 130, and a fan cover 136 of the air cooling fan 134 are integrally connected with a plurality of bolts 138 (only part of them are illustrated).

The brake 130 comprises a ring-shaped exciting coil 140 connected to and fixed on the motor case 122, a first brake shoe 142 fixed on the exciting coil 140, a second brake shoe 144 slidably disposed between the exciting coil 140 and the first brake shoe 142, and a brake ring 146 interposed between the first and second brake shoes 142 and 144 and integrally rotatable with the motor shaft 104A.

When the exciting coil 140 is energized, the second brake shoe 144 is attracted to the exciting coil 140, and the first and second brake shoes 142 and 144 separate from the brake ring 146, so that the motor shaft 104A is not braked. When the exciting coil 140 is not energized, on the other hand, the second brake shoe 144 is pressed against the brake ring 146. As a result, the brake ring 146 is sandwiched between the first and second brake shoes 142 and 144, and hence the motor shaft 104A is braked.

The resolver 132 comprises a rotor 148 coaxially fixed on the outer periphery of the motor shaft 104A, and a substantially ring-shaped stator 150 disposed on the outer periphery of the rotor 148. The stator 150 is supported by a stator holder (support member) 152, which is made of aluminum (non-magnetic material).

A coil 153, comprising an exciting coil and two pairs of output coils, is wound around the stator 150. The resolver 132 detects the turning angle of the motor shaft 104A by detecting difference in phases between two-phase output voltages (of the output coils) with respect to an exciting voltage (of the exciting coil).

Getting back to FIG. 1, the reducer 106 adopted in this exemplary embodiment is the so-called oscillating inner gearing planetary gear reducer. This reducer 106 has an input shaft (one end of the motor shaft 104A) 128, an external gear 156, an internal gear 158 internally engaged with the external gear 156, and an oscillating shaft 160 connected to the external gear 156. The external gear 156 is attached on the outer periphery of the input shaft 128 via an eccentric member 154, and is eccentrically and oscillatingly rotatable with respect to the input shaft 128. The oscillating shaft 160, absorbing an oscillating component of the external gear 156, can transmit motor power to a base rotor 162. The base rotor 162, which is integrated with the roller body 102, can rotate the roller body 102.

Next, the operation of the motorized roller 100 according to this exemplary embodiment of the present invention will be described.

When the motor shaft 104A (=input shaft 128) of the motor 104 turns 360 degrees, the external gear 156 eccentrically oscillates only one time around the input shaft 128 through the eccentric member 154. Due to this eccentric oscillation, the (internal) engagement position between the internal gear 158 and the external gear 156 successively shifts, and makes one turn. Since the number of teeth of the external gear 156 is fewer than the number of teeth of the internal gear 158 by N (N=1 in this exemplary embodiment), a phase of the external gear 156 shifts by "difference in the number of teeth N" with respect to the internal gear 158. In this exemplary embodiment, however, the external gear 156 is connected to the base rotor 162 through the oscillating shaft 160. Thus, the oscillating component of the external gear 156 is absorbed by the oscillating shaft 160, so that only a rotating component due to difference in phases is transmitted to the base rotor 162 as speed reduction rotation. Furthermore, the speed reduction rotation is transmitted to the roller body 102.

In the motorized roller 100 according to this exemplary embodiment of the present invention, the motor 104 is the brushless DC motor, and the resolver 132 is installed as the magnetic pole position detector of the blushless DC motor. Thus, the motorized roller can be used in a wide temperature range with high reliability, though the motorized roller is compact in size and manufactured at low cost. As a result, it is possible to provide a high power motorized roller, in which the diameter of the roller body 102 is 125 mm or less, and the motor 104 has a capacity of 0.1 kw or more.

Since the stator holder 152 (support member) for supporting the stator 150 of the resolver 132 is made of aluminum (non-magnetic material), it is possible to detect the turning angle of the motor shaft 104A with great precision. In other words, the motorized roller 100 includes the brake 130 having the exciting coil 140, so that there is a possibility that the motor shaft 104A, the brake 130, and the resolver 132 compose a magnetic circuit and the detection precision of the resolver 132 is reduced. However, it is possible to prevent reduction in the detection precision of the resolver 132, because the stator holder 152 made of the non-magnetic material is disposed between the brake 130 and the resolver 132.

In the foregoing exemplary embodiment, the stator 150 is supported by the stator holder 152 made of aluminum, but the stator 150 may be supported by a support member made of a non-magnetic material except for aluminum, or may be supported by another member.

Namely, the structure, shape, and the like of a motorized roller according to various exemplary embodiments of the present invention are not only those of the motorized roller 100 according to the foregoing exemplary embodiment, but also the motorized roller having a structure, shape and the like changeable as long as a motor is the brushless DC motor, and the resolver is installed as the magnetic pole position detector of the brushless DC motor.

The motorized roller according to various exemplary embodiments of the present invention is applicable to the fields of a motor pulley, a motor roller, and the like which are used in a conveyor and the like.

The disclosure of Japanese Patent Application No. 2003-390152 filed Nov. 20, 2003 including specification, drawing and claim are incorporated herein by reference in its entirety.

What is claimed is:

1. A motorized roller comprising:
   a roller body;
   a motor contained inside the roller body to rotate the roller body, the motor being a brushless DC motor; and
   a resolver as a detector for detecting a magnetic pole position of the brushless DC motor,
   wherein the resolver detects a turning angle of a motor shaft of the motor by detecting a difference in phases between two-phase output voltages of two pairs of output coils with respect to an exciting voltage of an exciting coil.

2. The motorized roller according to claim 1, wherein a support member for supporting a stator of the resolver is made of a non-magnetic material.

3. The motorized roller according to claim 1, wherein the capacity of the motor is equal to or more than 0.1 kw.

4. The motorized roller according to claim 2, wherein the capacity of the motor is equal to or more than 0.1 kw.

5. The motorized roller according to claim 1, wherein the diameter of the roller body is equal to or less than 125 mm.

6. The motorized roller according to claim 2, wherein the exciting coil and the two pairs of output coils are included in a coil surrounding the stator.

* * * * *